(12) United States Patent
Takahashi et al.

(10) Patent No.: US 7,850,769 B2
(45) Date of Patent: Dec. 14, 2010

(54) AIR FILTERING APPARATUS HAVING FOREIGN MATERIAL REMOVING MECHANISM

(75) Inventors: Kazuo Takahashi, Gunma (JP); Yoichi Uchida, Tochigi (JP); Hiroaki Usui, Gunma (JP); Tetsuya Yamamoto, Gunma (JP); Keiko Kurokawa, Gunma (JP); Masayuki Motegi, Gunma (JP); Tomohito Koizumi, Gunma (JP); Hiroyuki Umezawa, Gunma (JP); Tsuyoshi Rakuma, Gunma (JP); Toshio Fukushima, Gunma (JP); Toru Arakawa, Gunma (JP); Hiroyuki Kobayashi, Gunma (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 691 days.

(21) Appl. No.: 11/779,431

(22) Filed: Jul. 18, 2007

(65) Prior Publication Data
US 2008/0017039 A1  Jan. 24, 2008

(30) Foreign Application Priority Data

Jul. 20, 2006  (JP)  ............................... 2006-197930
Jul. 21, 2006  (JP)  ............................... 2006-199381

(51) Int. Cl.
*B01D 47/00* (2006.01)

(52) U.S. Cl. ............................... 96/239; 95/24; 95/196; 95/211; 96/240; 96/245; 96/296; 210/241; 210/259; 210/96.1; 210/202

(58) Field of Classification Search ........... 96/240–245, 96/274, 296–299, 276–277, 239; 95/149, 95/195–196, 205, 210–211, 206, 24; 261/108
See application file for complete search history.

(56) References Cited

U.S. PATENT DOCUMENTS 2,117,378 A * 5/1938 Tiffany ....................... 210/730
5,492,620 A * 2/1996 Evans ........................ 210/96.1

(Continued)

FOREIGN PATENT DOCUMENTS

JP      2000-189975    *  7/2000

(Continued)

*Primary Examiner*—Duane Smith
*Assistant Examiner*—Ives Wu
(74) *Attorney, Agent, or Firm*—Westerman, Hattori, Daniels & Adrian, LLP

(57) ABSTRACT

An air filtering apparatus including a housing having an air suction port and air blow-out port, an electrolytic bath for generating electrolytic water, a gas-liquid contact member disposed in the housing, an electrolytic water supply unit for supplying the electrolytic water to the gas-liquid contact member so that the electrolytic water infiltrates into the gas-liquid contact member, an air blowing fan for bringing indoor air sucked from the air suction port into contact with the electrolytic water infiltrating in the gas-liquid contact member and blowing out the indoor air from the air blow-out port, a water receiving portion for receiving the electrolytic water passed through the gas-liquid contact member, and a foreign material removing mechanism for removing foreign materials contained in the electrolytic water. The foreign material may be a filter member disposed in front of the gas-liquid contact member, or a dam member disposed in the water receiving portion.

16 Claims, 11 Drawing Sheets

U.S. PATENT DOCUMENTS

| | | | |
|---|---|---|---|
| 5,626,748 A * | 5/1997 | Rose | 210/241 |
| 5,939,031 A * | 8/1999 | Ellis et al. | 422/191 |
| 6,086,055 A * | 7/2000 | Armstrong et al. | 261/96 |
| 6,367,782 B1 * | 4/2002 | Guetersloh | 261/106 |
| 6,843,835 B2 * | 1/2005 | Fornai et al. | 96/53 |
| 7,445,198 B2 * | 11/2008 | Monkelbaan | 261/97 |
| 2002/0027070 A1 * | 3/2002 | Oyokota et al. | 204/257 |
| 2003/0046911 A1 * | 3/2003 | Klobucar et al. | 55/443 |
| 2003/0056648 A1 | 3/2003 | Fornai et al. | |
| 2005/0000243 A1 | 1/2005 | Hwang et al. | |
| 2006/0163758 A1 * | 7/2006 | Muller | 261/114.1 |

FOREIGN PATENT DOCUMENTS

| | | |
|---|---|---|
| JP | 2000-257914 A | 9/2000 |
| JP | 2001-219171 A | 8/2001 |
| JP | 2002-181358 A | 6/2002 |

* cited by examiner

AIR FILTERING APPARATUS HAVING FOREIGN MATERIAL REMOVING MECHANISM

INCORPORATION BY REFERENCE

The present application claims priority under 35 U.S.C. §119 to Japanese Patent Application No. 2006-197930 filed on Jul. 20, 2006 and Japanese Patent Application No. 2006-199381 filed on Jul. 21, 2006. The content of the applications is incorporated herein by reference in its entirety.

BACKGROUND OF THE INVENTION

1. Field of the Invention

The present invention relates to an air filtering apparatus that can remove microorganisms floating in the air (bacteria, virus, fungus, etc. (hereinafter referred to as "virus, etc.").

2. Description of the Related Art

For the purpose of removing virus, etc. floating in the air, there has been proposed an air filtering apparatus for filtering air by using electrolytic water (for example, JP-A-2002-181358). According to this air filtering apparatus, water such as tap water or the like is electrolyzed to generate electrolytic water containing active oxygen species such as hypochlorous acid, etc., and the thus-generated electrolytic water is supplied to a humidification element (a filter element, a gas-liquid contact member or the like) formed of nonwoven cloth or the like. Then, virus, etc. in the air is brought into contact with the electrolytic water supplied to the humidification element to inactivate the virus, etc. while the air flows through the humidifying element, thereby filtering the air. The filtered air is made to flow to the outside of the apparatus.

In the conventional air filtering apparatus described above, water such as tap water or the like used for electrolysis is condensed due to vaporization or the like, so that foreign materials such as scales caused by calcium ions, magnesium ions or the like contained in tap water or the like may be generated or occur. Furthermore, when tap water or the like is electrolyzed, calcium ions, magnesium ions or the like contained in the tap water or the like are oxidized and scales formed of calcium carbonate, magnesium carbonate or the like are deposited on electrodes. If the electrodes are coated with scales, the electric conductivity is lowered or flow of liquid to the electrolysis surfaces of the electrodes is disturbed by the scales, so that the electrolysis performance and the durability of the electrodes are lowered. Therefore, it has been hitherto necessary to frequently execute the maintenance work to withdraw these scales, and this causes the cost-up for the maintenance.

SUMMARY OF THE INVENTION

An object of the present invention is to provide an air filtering apparatus that can make a maintenance work easy and reduce the frequency of the maintenance.

In order to attain the above object, according to the present invention, an air filtering apparatus comprises: a housing having an air suction port and air blowing port; an electrolytic bath for generating electrolytic water; a gas-liquid contact member disposed in the housing; an electrolytic water supply unit for supplying the electrolytic water to the gas-liquid contact member; an air blowing fan for bringing indoor air sucked from the air suction port into contact with the electrolytic water supplied to the gas-liquid contact member and then blowing out the indoor air from the air blowing port; and a water receiving portion (water receiving tray) for receiving the electrolytic water passing through the gas-liquid contact member, wherein the housing contains an electrolytic water supply/circulation path along which the electrolytic water is supplied from the electrolytic bath through the electrolytic water supply unit to the gas-liquid contact member, and further flows from the gas-liquid contact member through the water receiving portion, and the electrolytic water supply/circulation path is equipped with a foreign material removing mechanism for removing foreign materials contained in the electrolytic water flowing through the electrolytic water supply/circulation path.

According to the above-described air filtering apparatus, the electrolytic water bath generates electrolytic water, and the electrolytic water supply unit supplies the electrolytic water to the gas-liquid contact member. The air blowing fan brings the indoor air sucked from the suction port of the housing into contact with the electrolytic water supplied (infiltrated, dropped or the like) to the gas-liquid contact member to filter the indoor air, and then blows out the filtered indoor air from the air blowing port.

At this time, scales such as calcium carbonate, magnesium carbonate, etc. contained in the electrolytic water generated in the electrolytic bath, scales deposited from the electrolytic water, insoluble matters such as colloidal silica, humic acid, etc. (hereinafter referred to as "foreign materials") can be removed at least one place in the electrolytic water supply/circulating path by the foreign material removing mechanism. Therefore, the maintenance work can be facilitated, and the frequency of the maintenance work can be reduced.

Furthermore, every time foreign materials such as scales, etc. flow out from the electrolytic bath together with the electrolytic water, the foreign materials and the electrolytic water can be separated from each other and only the foreign materials can be withdrawn by the foreign material removing mechanism. Therefore, for example, it is unnecessary for a user or the like to withdraw scales, etc. by a manual labor or the like every time the scales, etc. are removed from electrodes, and thus the frequency of the maintenance can be reduced.

In the above-described construction of the air filtering apparatus, the foreign material removing mechanism may be equipped with a filter member that is freely detachably mounted in the electrolytic water supply unit and filters the electrolytic water introduced from the electrolytic bath, and the electrolytic water supply unit has an electrolytic water supply tray having an electrolytic water supply hole at the bottom portion thereof, the electrolytic water passing through the filter member being supplied to the gas-liquid contact member through the electrolytic water supply hole.

According to the above-described construction of the air filtering apparatus, the gas-liquid contact member is supplied with the electrolytic water from which the foreign materials are removed, and thus foreign materials such as scales, humic acid, etc. can be prevented from adhering to the gas-liquid contact member, and thus the frequency of the maintenance of the gas-liquid contact member can be reduced.

The filter member may be configured to be freely detachable from the electrolytic water supply tray. Therefore, when the filter member is clogged with foreign materials, the filter member can be easily exchanged and thus the maintenance is easier.

Furthermore, the above air filtering apparatus may be further equipped with a water level sensor for detecting the water level in the electrolytic water supply tray and an alarm unit for alarming a user so that the filter member should be exchanged when it is detected by the water level sensor that the water level in the electrolytic water supply tray reaches a predetermined water level.

According to this air filtering apparatus, when the filter member is clogged, the water level of the electrolytic water in the electrolytic water supply tray increases. At this time, when it is detected by the water level sensor that the water level reaches the predetermined water level, the alarm unit alarms the exchange of the filter member to the user. Accordingly, the user, a maintenance manager or the like can be easily grasp the exchange timing of the filter member, that is, the maintenance timing.

In the above air filtering apparatus, it is preferable that the electrolytic water supply unit has a bypass path for supplying the gas-liquid contact member with electrolytic water overflowing from the electrolytic water supply tray.

According to this air filtering apparatus, when the filter member is clogged with foreign materials such as scales, humic acid, etc. and thus the water level in the electrolytic water supply tray, so that the electrolytic water flows over the electrolytic water supply tray, the over-flowing electrolytic water can be supplied to the gas-liquid contact member through the bypass path. Accordingly, even when the filter member cannot be exchanged, the air filtering apparatus can be continuously operated.

Furthermore, in the above air filtering apparatus, the electrolytic water preferably contains active oxygen species achieved by supplying current to electrodes in the electrolytic bath to electrolyze water or water containing chlorine ions.

According to this air filtering apparatus, the active oxygen species can be added to the electrolytic water supplied to the gas-liquid contact member, and thus the air filtering effect on virus, etc. contained in the air can be enhanced by the oxidizing action of the active oxygen species, and also bad smell components contained in the air can be deodorized. Furthermore, the gas-liquid contact member can be sterilized and deodorized by the active oxygen species.

In the above air filtering apparatus, the active oxygen species preferably contain at least one material selected from the group consisting of hypochlorous acid, ozone and hydrogen peroxide.

According to this air filtering apparatus, by using chlorine ions contained in tap water or the like, active oxygen species can be easily generated by electrolyzing water without injecting chemical material.

In the above air filtering apparatus, for example when foreign materials contained in electrolytic water contain scales removed from electrodes by polarity inversion, scales deposited from the electrolytic water or colloidal silica suspended material flow out from the electrolytic bath, the scales or the like can be withdrawn by the filter member.

Furthermore, in the above-described air filtering apparatus of the present invention, the foreign material removing mechanism may be equipped with a dam member that is provided in the water receiving portion for trapping the foreign materials contained in the electrolytic water in the water receiving portion.

The above air filtering apparatus may be further equipped with a circulating pump for supplying the electrolytic bath with the electrolytic water received by the water receiving portion, wherein when the electrolytic water is supplied to the electrolytic bath by the circulating pump, the foreign materials contained in the electrolytic water are trapped in the water receiving portion by the dam member.

According to the above air filtering apparatus, the electrolytic bath generates electrolytic water, and the electrolytic water supply unit supplies the electrolytic water to the gas-liquid contact member. Then, the air blowing fan supplies air (indoor air) sucked from the suction port of the housing to the gas-liquid contact member to bring the air into contact with the electrolytic water and filter the air, and then blows out the filtered air from the air blowing port. The electrolytic water from the gas-liquid contact member is received in the water receiving portion and supplied to the electrolytic bath again by the circulating pump. That is, the electrolytic water is circulated through the electrolytic water supply/circulating path.

At this time, the foreign materials such as scales, insoluble materials, etc. contained in the electrolytic water received in the water receiving portion are trapped in the water receiving portion, and the foreign materials are prevented from being supplied to the electrolytic bath by the circulating pump. Therefore, only the electrolytic water from which the foreign materials are separated is supplied into the electrolytic bath, and the electrolysis performance and the durability of the electrodes in the electrolytic bath can be kept, and the frequency of the maintenance to withdraw the foreign materials can be reduced.

In the above air filtering apparatus, the circulating pump may be configured to supply the electrolytic bath with the electrolytic water flowing over the dam member.

The above air filtering apparatus may be further equipped with an electrolytic water stock portion into which the electrolytic water flowing over the dam member from the water receiving portion so that the electrolytic water stock portion is continuous (articulated) with the water receiving portion, and the circulating pump may supply the electrolytic water flowing into the electrolytic water stock portion into the electrolytic bath.

In the above air filtering apparatus, the dam member may comprise a plurality of dams. By providing the plural dams, the foreign materials can be prevented from flowing out at each dam, and thus the foreign materials such as scales, insoluble materials, etc. can be more surely prevented from being supplied to the electrolytic bath together with the electrolytic water by the circulating pump.

In the above air filtering apparatus, the water receiving portion may be configured to slant in the flowing direction of the electrolytic water so that the plural dams are arranged to be higher at the upstream side and lower at the downstream side with respect to the flowing direction of the electrolytic water. The dams may be formed of filters.

In the above air filtering apparatus, the foreign materials contain scales, and a deposition promoting member for promoting deposition of scale components contained in the electrolytic water may be provided in the water receiving portion.

According to the above air filtering apparatus, the scale components contained in the electrolytic water can be deposited by the deposition promoting member, and dammed by the dam member to be withdrawn. Accordingly, the scales as foreign materials can be efficiently removed from the electrolytic water.

Furthermore, in the above air filtering apparatus, the water receiving portion may be equipped with a discharging valve for discharging foreign materials trapped in the water receiving portion by the dam member from the water receiving portion to the outside together with the electrolytic water.

According to the above air filtering apparatus, the foreign materials such as scales, insoluble materials, etc. by the dam member can be discharged from the water receiving portion to the outside through the discharge valve together with the electrolytic water.

Furthermore, in the above air filtering apparatus, the electrolytic water preferably contain active oxygen species achieved by supplying current to electrodes of the electrolytic bath to electrolyze water such as tap water or the like.

According to this air filtering apparatus, the active oxygen species can be added to the electrolytic water supplied to the gas-liquid contact member, and thus the air filtering effect on virus, etc. contained in the air can be enhanced by the oxidizing action of the active oxygen species, and also bad smell components contained in the air can be deodorized. Furthermore, the water receiving portion (tray) can be sterilized and deodorized by the active oxygen species.

In the above air filtering apparatus, the active oxygen species preferably contain at least one material selected from the group consisting of hypochlorous acid, ozone and hydrogen peroxide.

According to this air filtering apparatus, by using chlorine ions contained in tap water or the like, active oxygen species can be easily generated by electrolyzing water without injecting chemical material.

According to the air filtering apparatus of the present invention, foreign materials such as scales, insoluble materials, etc. contained in electrolytic water can be withdrawn from the electrolytic water supply/circulation path by the detachable filter or the dam member, so that the maintenance can be easily performed and the frequency of the maintenance can be reduced. Furthermore, the electrolytic water from which the foreign materials can be supplied to the gas-liquid contact member, so that adherence of the foreign materials to the gas-liquid contact member can be prevented and the frequency of the maintenance can be reduced.

Furthermore, the foreign materials such as scales, insoluble materials, etc. contained in electrolytic water in the water receiving portion are trapped (dammed) in the water receiving portion by the dam member provided to the water receiving portion. Therefore, the electrolytic performance and the durability of the electrodes can be kept, and also the frequency of the maintenance can be reduced.

BRIEF DESCRIPTION OF THE DRAWINGS

FIGS. 6A and 6B are systematic diagrams showing an electrolytic water supply unit provided to the air filtering apparatus of the present invention, wherein FIG. 6A is a front view and FIG. 6B is a diagram showing the construction of an electrolytic bath;

FIGS. 10A and 10B are diagrams showing an electrolytic water supply/circulation state of the air filtering apparatus having a water receiving tray equipped with a foreign material removing mechanism according to a second embodiment, wherein FIG. 10A is a perspective view and FIG. 10B is a front view.

DETAILED DESCRIPTION OF THE PREFERRED EMBODIMENTS

Preferred embodiments according to the present invention will be described.

Figure 1:
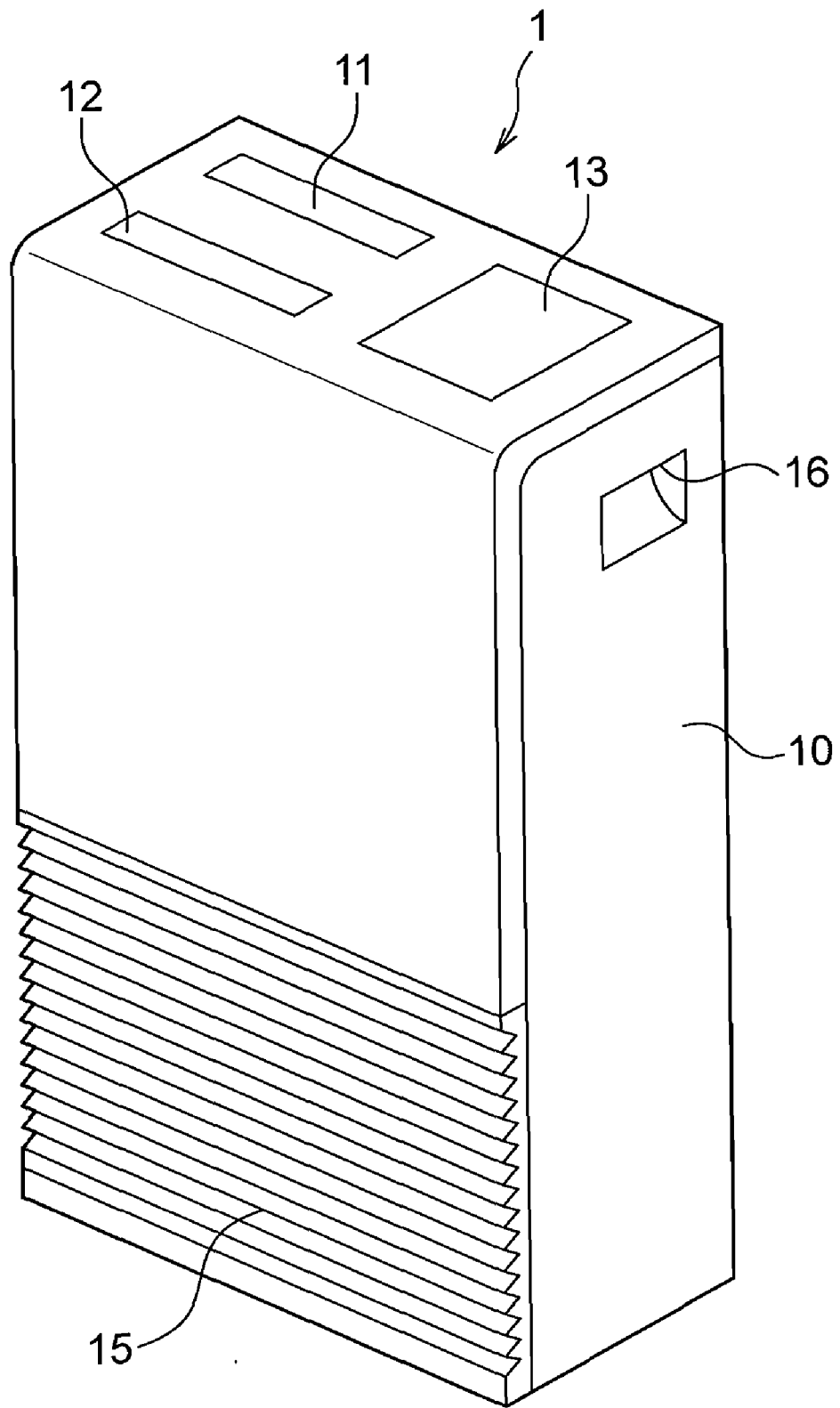
FIG. 1 is a perspective view showing the outlook of an air filtering apparatus of the present invention.

FIG. 1 is a perspective view showing the outlook of an air filtering apparatus 1 according to an embodiment of the present invention. As shown in FIG. 1, the air filtering apparatus is an on-floor mount type air filtering apparatus, however, the air filtering apparatus of the present invention is not limited to the on-floor mount type, but it may be an in-ceiling mount type (cassette type), a wall-suspended type or the like.

The air filtering apparatus shown in FIG. 1 has an elongated box-shaped housing 10, and an operating panel 11, an air blow-out port 12 and an opening/closing lid 13 are provided on the top of the hosing 10. The opening/closing lid 13 is used to take out/load a water supply tank 6 (see FIG. 2) from/into the housing 10. The air blow-out port 12 is provided with a vane 14 (automatic louver (see FIG. 3)) for changing the air blow-out direction.

An air suction port 15 is formed at the lower portion of the front face of the housing 10. Furthermore, recess portions 16 are formed at the upper portions of both the side surfaces of the housing 10, and a transporter can lift up and move the air filtering apparatus alone while using the recess portions 16 as grip portions.

Figure 2:
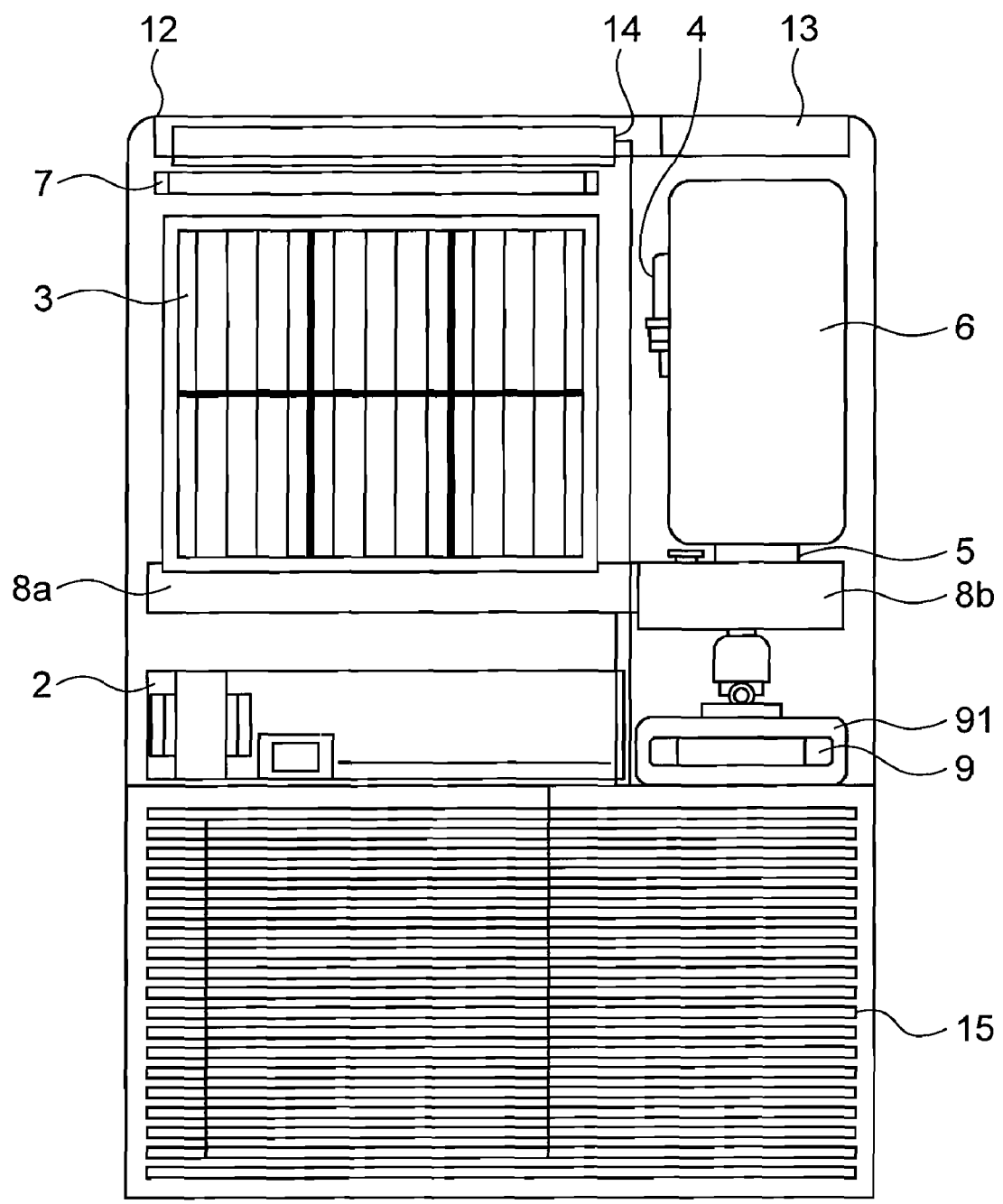
FIG. 2 is a front view showing the internal construction of the air filtering apparatus of FIG. 1.

Next, the internal construction of the air filtering apparatus 1 will be described with reference to FIGS. 2 to 4. FIG. 2 is a front view showing the internal construction of the air filtering apparatus 1, FIG. 3 is a left side view showing the air filtering apparatus 1, and FIG. 4 is a right side view showing the air filtering apparatus 1.

Figure 3:
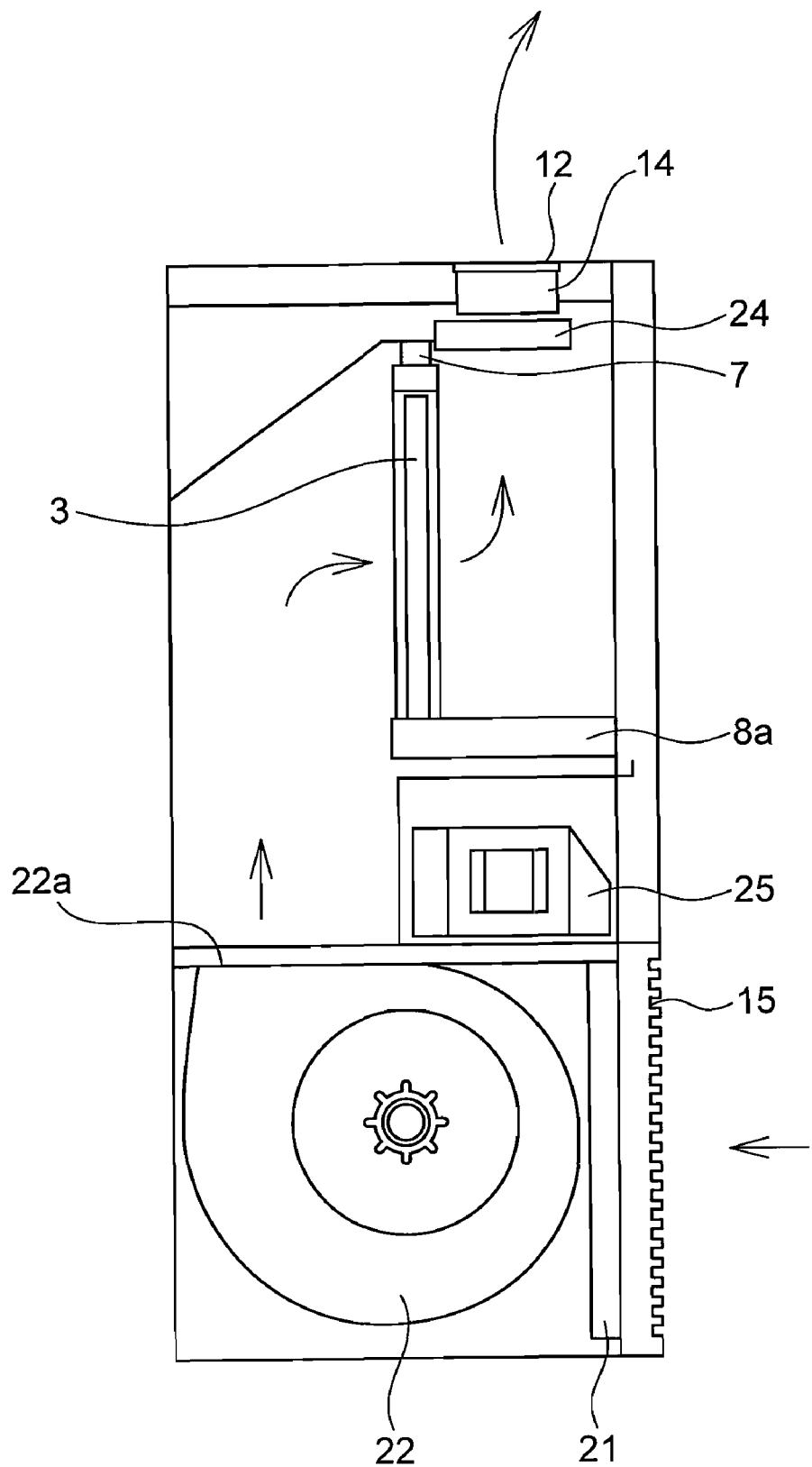
FIG. 3 is a left side view showing the internal construction of the air filtering apparatus of FIG. 1.

A shown in FIGS. 2 and 3, a pre-filter 21 is disposed inside the air suction port 15 formed in the housing 10. The pre-filter 21 captures pollen, dust, etc. contained in air sucked from the air suction port 15. This embodiment adopts a pre-filter 21 which can capture floated materials having particle sizes of 10 μm or more and floated in the air.

Figure 4:
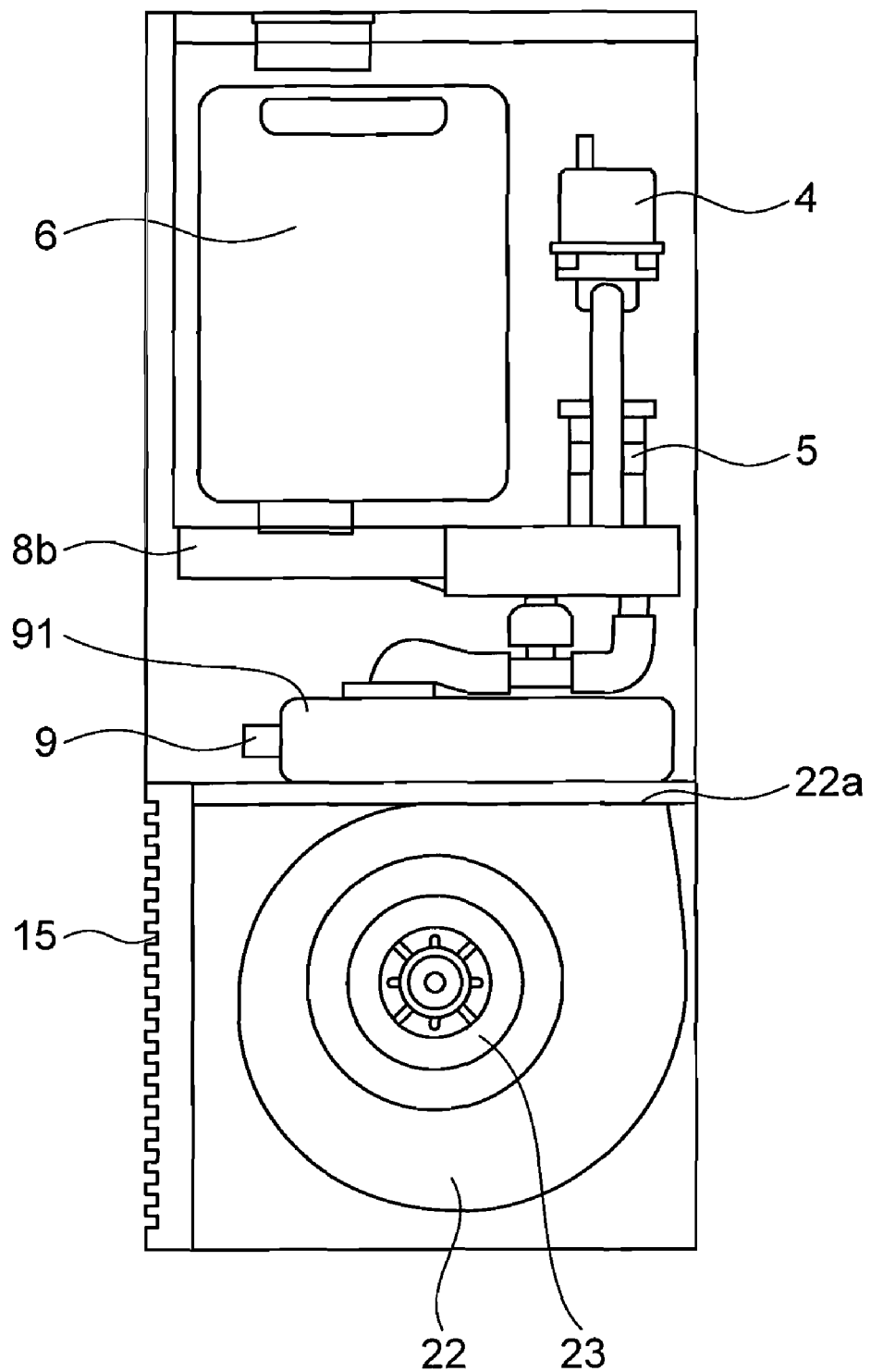
FIG. 4 is a right side view showing the internal construction of the air filtering apparatus of the present invention.

As shown in FIGS. 3 and 4, an air blowing fan 22 is disposed in the pre-filter 21, and the air suction port of the air blowing fan 22 faces the air suction port 15 of the housing 10. As shown in FIG. 3, an air flowing port 22a faces the top surface of the housing 10. The air blowing fan 22 is driven by a driving motor 23, and indoor air sucked from the air suction port 15 by the air blowing fan 22 is passed from the air flowing port 22a of the air blowing fan 22 through a passage indicated by an arrow of FIG. 3 to the gas-liquid contact member 3. The gas-liquid contact member 3 is provided on an air flowing path directing from the air suction port 15 to the air blow-out port 12, and it is disposed so as to be substantially erected in the housing 10. The air is filtered (i.e., the virus, etc. are inactivated or the like) while passing through the gas-liquid contact member 3, and the filtered air is passed through an air blowing filter 24 and fed from the air blow-out port 12 into the room again. The air filtering of the gas-liquid contact member 3 will be described later.

An electrolytic water supply pipe 71 is disposed above the gas-liquid contact member 3, and the electrolytic water supply pipe 71 is connected to an electrolytic bath 4 shown in FIGS. 2 and 4. In the electrolytic bath 4 shown in FIGS. 2 and 4, water (for example, well water or the like) or water containing chlorine ions (for example, tap water (city water) or water added with chlorine ions) is electrolyzed to generate electrolytic water, and the thus-generated electrolytic water is supplied to the gas-liquid contact member 3. Water or water containing chlorine ions (hereinafter referred to as "tap water or the like") stocked in the water supply tank 6 is supplied to the electrolytic bath 4 by the circulating pump 5. A water spray box 7 (electrolytic water supply unit) is provided to the upper edge portion of the gas-liquid contact member 3, and electrolytic water is dropped from the spray box 7 into the gas-liquid contact member 3.

The electrolytic water discharged from the gas-liquid contact member 3 is stocked in the water receiving portion (tray) 8a, and then flows to a water supply tank support tray 8b for supporting the water supply tank 6. The electrolytic water stocked in the water supply tank support tray 8b and tap water or the like supplied from the water supply tank 6 is pumped again by the circulating pump 5 and then supplied to the electrolytic bath 4. Furthermore, the water supply tank support tray 8b is provided with a drain valve (not shown), and the water (electrolytic water) in the water supply tank support tray 8b is discharged to a drain tray 9 by opening the drain valve. The drain tray 9 can be freely drawn out from a drain tray support portion 91, and a user or the like is allowed to discard the water in the drain water 9 and clean the drain tray 9.

As shown in FIGS. 2 and 3, an electronic component box 25 is disposed between the air blowing fan 22 and the gas-liquid contact member 3 in the housing 10, and electrical component parts such as a control board, etc. (not shown) for controlling each part of the air filtering apparatus 1 are accommodated in the electric component box 25.

Figure 5:
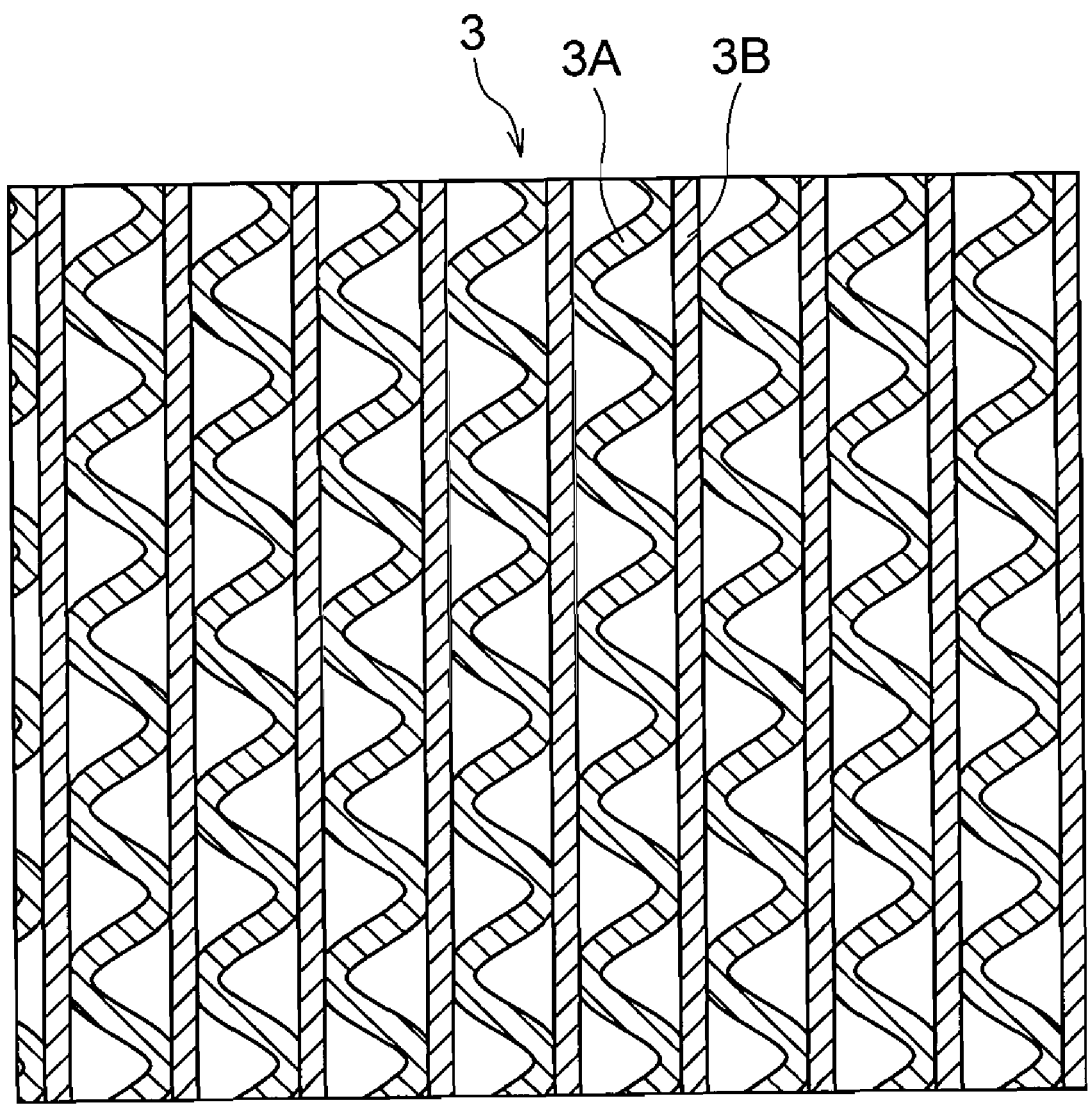
FIG. 5 is a front view showing a gas-liquid contact member provided to the air filtering apparatus of the present invention.

The gas-liquid contact member 3 is a filter member having a homey comb structure. Accordingly, the gas-liquid contact area can be kept large, electrolytic water can be dropped, and clogging occurs hardly. That is, as shown in FIG. 5, the gas-liquid contact member 3 includes corrugated raw members 3A bent in a corrugated shape and flat-plate type raw members 3B, the corrugated raw members 3A and the flat-plate type raw members 3B being joined to one another, whereby they are assembled in a homey comb structure as a whole.

The raw members 3A and 3B are formed of materials having little reactivity to electrolytic water as described later, that is, materials that are not deteriorated by the electrolytic water, for example, they are formed of polyolefin type resin (polyethylene resin, polypropylene resin or the like), PET (polyethylene-terephthalate) resin, vinyl chloride resin, fluorinated resin (PTFE, PFA, ETFE or the like), cellulose type material, ceramics type material or the like. In this embodiment, PET resin is used for the members 3A and 3B.

The gas-liquid contact member 3 may be subjected to a hydrophilic treatment to increase of the affinity to electrolytic water. Accordingly, the water retentivity (wettability) of the electrolytic water of the gas-liquid contact member 3 can be kept excellent, and the contact between active oxygen species and indoor air can be continued for a long time. Furthermore, electrolytic water having a mildewproof action is dropped to or infiltrated into the gas-liquid contact member 3, so that it is unnecessary to coat mildewcide on the gas-liquid contact member 3 as a countermeasure of proofing mildew.

Figure 6A:
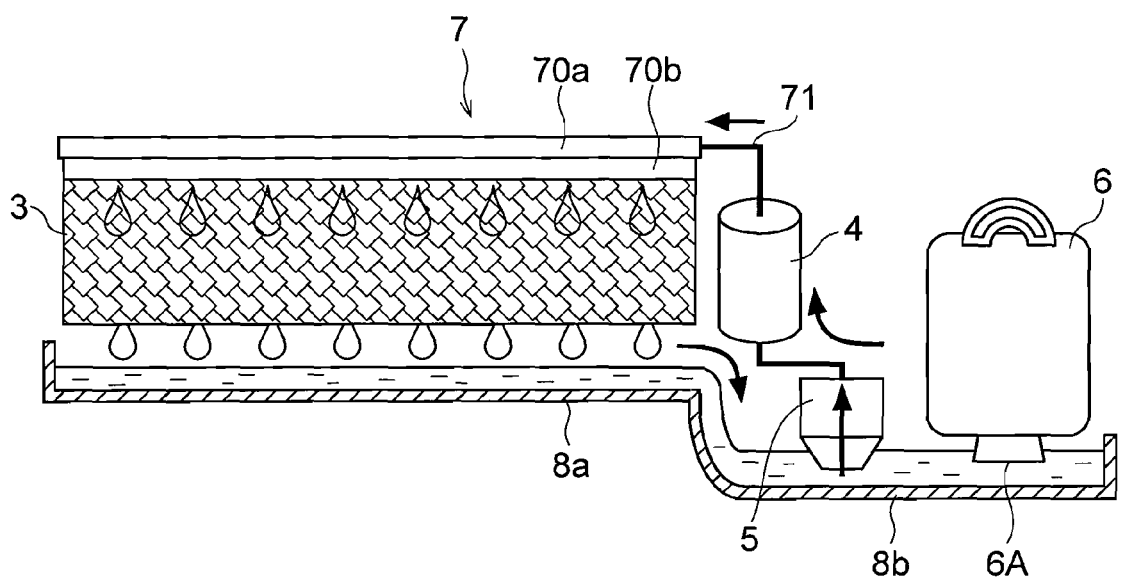

FIG. 6A is a diagram showing a supply state of electrolytic water to the gas-liquid contact member 3.

As shown in FIG. 6A, the water receiving portion (tray) 8a is disposed below the gas-liquid contact member 3 of PET, and the water supply tank support portion (support tray) 8b which continuously intercommunicates with the water receiving portion 8a. The water supply port 6A of the water supply tank 6 and the circulating pump 5 are disposed in the water supply tank support tray 8 as shown in FIG. 6A. Tap water or the like stocked in the water supply tank 6 is supplied from the water supply port 6A to the water supply tank support tray 8b. The electrolytic bath 4 is connected to the circulating pump 5, and tap water or the like supplied to the water supply tank support tray 8b and electrolytic water flowing from the water receiving tray 8a to the water supply tank support tray 8b are supplied to the electrolytic bath 4 by the circulating pump 5.

Figure 6B:
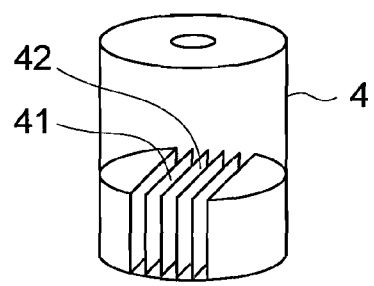

FIG. 6B is a diagram showing the internal structure of the electrolytic bath 4. As shown in FIG. 6B, the electrolytic bath 4 includes one or more pairs of electrodes 41 and 42, and by applying a voltage between the electrodes 41, 42, these electrodes 41, 42 electrolyze water or the like flowing into the electrolytic bath 4 to generate electrolytic water containing active oxygen species.

Here, the active oxygen species means oxygen molecules having higher oxidizing activity than normal oxygen and also related substance thereof, and contain not only so-called narrowly-defined active oxygen such as superoxide anion, singlet oxygen, hydroxyl radical and hydrogen peroxide, but also so-called broadly-defined active oxygen such as ozone, hypohalous acid, etc.

In this embodiment, the electrolytic bath 4 is disposed in the vicinity of the gas-liquid contact member 3 so that active oxygen species generated by electrolyzing water (tap water or the like) can be immediately supplied to the gas-liquid contact member 3.

The electrodes 41, 42 are electrode plates each of which comprises a base of Ti (titan) and a coated layer of Ir (iridium), Pt (platinum).

When current is supplied to tap water or the like by the electrodes 41, 42, the following reaction occurs at the cathode:

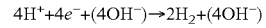
$$4H^+ + 4e^- + (4OH^-) \rightarrow 2H_2 + (4OH^-)$$

Furthermore, the following reaction occurs at the anode:

$$2H_2O \rightarrow 4H^+ + O_2 + 4e^-$$

At the same time, chlorine ions contained water (chlorine ions are added in tap water in advance) reacts as follows:

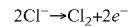
$$2Cl^- \rightarrow Cl_2 + 2e^-$$

Furthermore, $Cl_2$ thus generated reacts with water as follows:

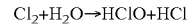
$$Cl_2 + H_2O \rightarrow HClO + HCl$$

In this construction, by supplying current to the electrodes 41, 42, HClO (hypochlorous acid) having strong sterilizing power is generated. By supplying the gas-liquid contact member 3 with the electrolytic water containing this hypochlorous acid or the like, breeding of various bacteria in the gas-liquid contact member 3 can be prevented. Accordingly, virus, etc. floating on air passing through the gas-liquid contact member 3 can be inactivated or sterilized. Furthermore, when gas materials such as odor components, etc. pass through the gas-liquid contact member 3, the odor components also react with hypochlorous acid in the electrolytic water, and they are ionized and dissolved, whereby the odor components can be removed from air and the air is deodorized.

By supplying a predetermined current density of current (for example, $20\,mA/cm^2$) to the electrodes 41, 42 electrolytic water containing active oxygen species of predetermined concentration (for example, free residual chlorine density of 1 mg/l or the like), and the concentration of the active oxygen species contained in the electrolytic water can be adjusted by adjusting the current value. Basically, by increasing the current value, the concentration of the active oxygen species in the electrolytic water can be increased.

When scales (for example, calcium-based scales such as calcium carbonate or the like, magnesium-based scales such as magnesium carbonate or the like) deposit on the electrodes 41, 42 (cathode) due to electrolysis of tap water or the like, the electrical conductivity is lowered or flow of water to the surfaces of the electrodes is disturbed, so that it is difficult to continue electrolysis. Therefore, according to this embodiment, the polarities of the electrodes 41, 42 are periodically inverted (the plus and minus polarities of the electrodes 41 and 4 are switched to each other). In this case, the polarities of the electrodes 41, 42 are inverted and water is electrolyzed while the cathode electrode is made to function as an anode electrode, thereby removing the scales depositing on the cathode electrode. In this polarity inverting control, the polarities may be periodically inverted by using a timer, for example, and the polarities may be irregularly inverted like the polarities are inverted every time the operation of the apparatus is started. Furthermore, increase of the electrolysis resistance (decrease of electrolysis current or increase of electrolysis voltage) may be detected, and the polarities may be inverted on the basis of the detection result.

The electrolytic water supply pipe 71 inserted in the water spray box 7 is connected to the electrolytic bath 4. In the electrolytic bath 4, the electrolytic water thus generated is introduced to the electrolytic water supply pipe 71.

The scales which are removed by inverting the polarities or the like flow out from the electrolytic bath 4 together with the electrolytic water, and are supplied to the gas-liquid contact member 3. When electrolytic water containing insoluble materials such as scales, etc. (hereinafter referred to as "foreign materials") is supplied to the gas-liquid contact member 3, it causes clogging of the gas-liquid contact member 3. The foreign materials passing through the gas-liquid contact member 3 are discharged to the water receiving tray 8a together with the electrolytic water. Foreign materials such as scales, etc. may be deposited from electrolytic water due to evaporation of water or the like. Furthermore, insoluble suspended substance such as colloidal silica, humic acid, etc. may be contaminated into the electrolytic water. Accordingly, these foreign materials may be returned to the electrolytic bath 4 again by the circulating pump 5, resulting in degradation of the electrolysis performance. Therefore, for example when scales are removed from the electrodes by the polarity inversion or the like, these scales are preferably withdrawn every time the polarities are inverted.

In order to satisfy this requirement, according to the present invention, a foreign material removing mechanism for removing foreign materials such as scales, etc. is provided in an electrolytic water supply path or electrolytic water circulating path (hereinafter referred to as electrolytic water supply/circulation path).

Here, the setup position of the foreign material removing mechanism for scales, etc. and the foreign material removing action thereof will be described hereunder.

First, a first embodiment of the foreign material removing mechanism according to the present invention will be described hereunder with reference to FIGS. 7 to 9.

In the first embodiment, foreign materials such as scales, colloidal silica, humic acid, etc. contained in electrolytic water introduced from the electrolytic bath 4 are removed by a filter member 72 (FIG. 7) which is freely detachably mounted in the water spray box 7. When the filter member 72 is clogged, the filter member 72 is exchanged by a new one, so that the maintenance can be easily performed and also the frequency of the maintenance itself can be reduced. Furthermore, electrolytic water can be supplied to the gas-liquid contact member 3 after foreign materials are removed from the electrolytic water concerned, so that the clogging, etc. of the gas-liquid contact member 3 can be prevented and the frequency and labor of the maintenance can be reduced.

The construction of the water spray box will be described with reference to FIGS. 7 to 9. FIG. 7 is a cross-sectional view, FIG. 8 is a cross-sectional view taken in an arrow of X-X', and FIG. 9 is a cross-sectional view taken in an arrow of Y-Y'.

Figure 7:
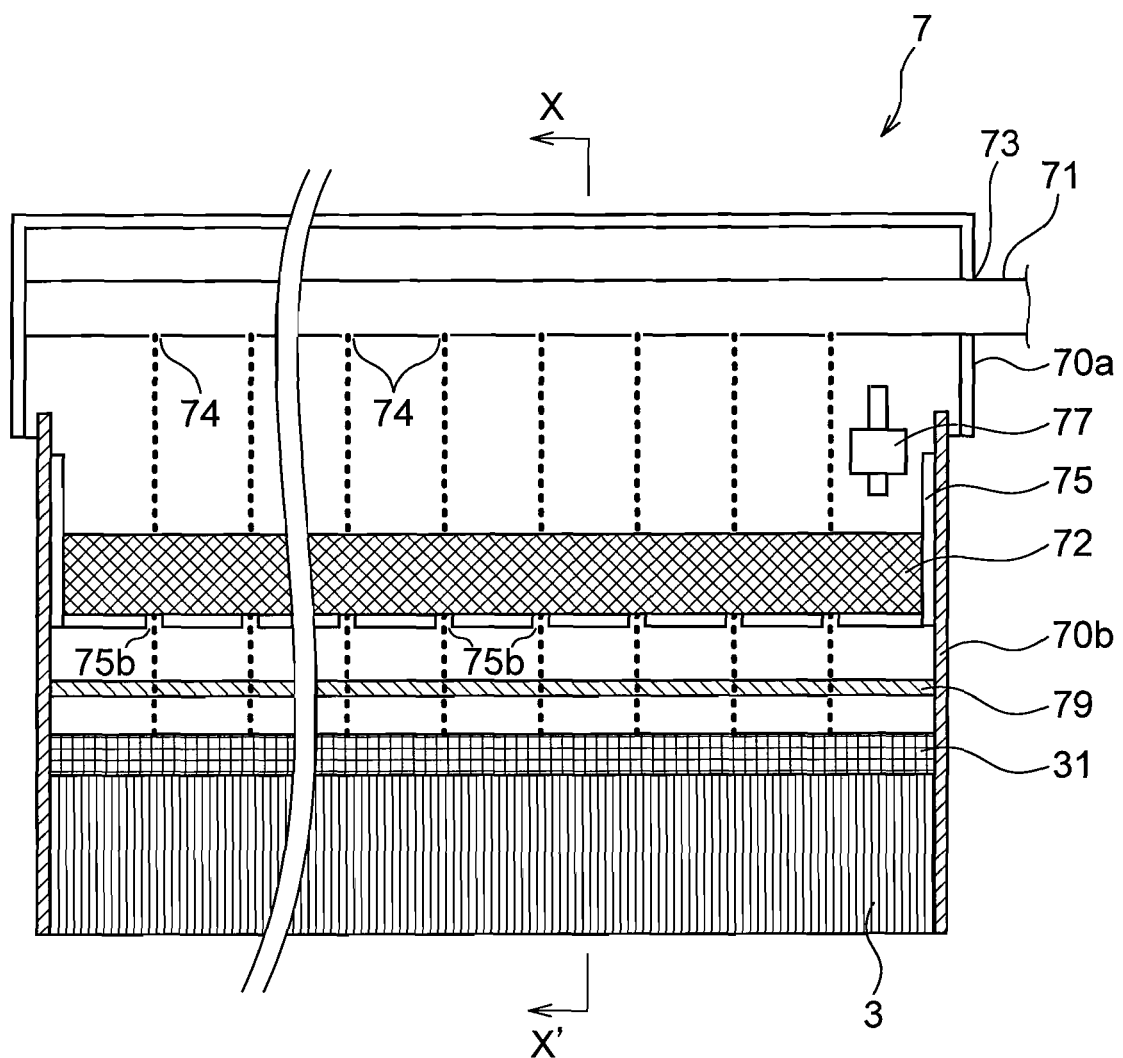
FIG. 7 is a cross-sectional view showing the construction of the electrolytic water supply unit (water spraying box) having a foreign material removing mechanism according to a first embodiment of the present invention.
Figure 8:
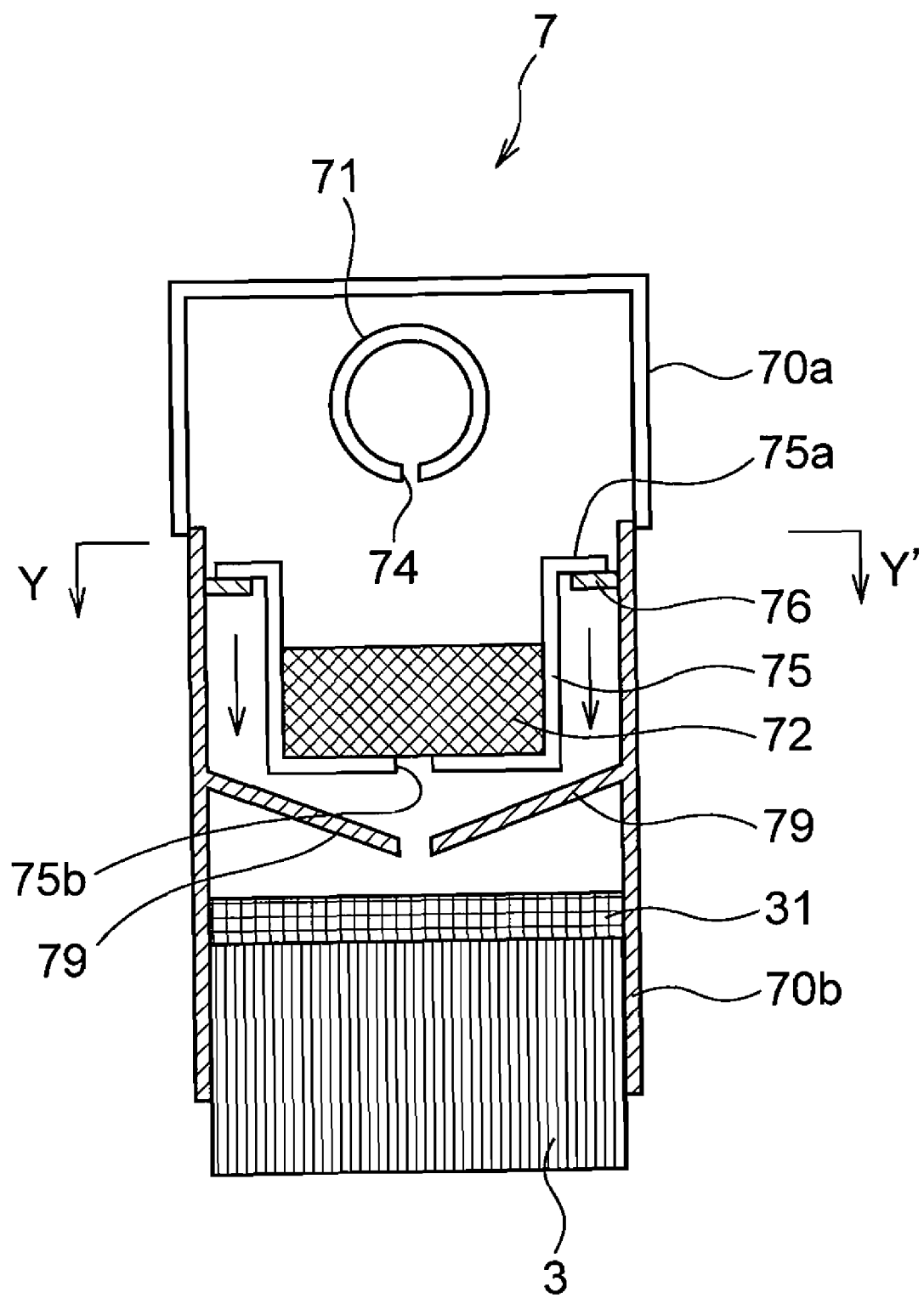
FIG. 8 is a X-X' cross-sectional view of the electrolytic water supply unit of FIG. 7.

As shown in FIGS. 7 and 8, the water spray box 7 is assembled to the upper edge portion of the gas-liquid contact member 3, and it supplies electrolytic water to the gas-liquid contact member 3. The water spray box 7 is designed in the form of a box having no bottom. The water spray box 7 is mainly divided into an electrolytic water supply pipe unit 70a which is designed in the form of a box lid, and a filter unit 70b which is designed in the form of a box main body having no bottom.

As shown in FIG. 8, an insertion hole 73 through which an electrolytic supply pipe 71 is inserted is formed in the electrolytic water supply pipe unit 70a. The electrolytic water supply pipe unit 70a is detachable from the filter unit 70b under the state that the electrolytic water supply pipe 71 is inserted in the insertion hole 73. Many water spray holes 74 are formed at the lower portion of the electrolytic water supply pipe 71. Electrolytic water introduced from the electrolytic bath 4 is sprayed from the water spray holes 74 to the filter unit 70b.

The filter unit 70b has an electrolytic water supply tray 75 for receiving electrolytic water sprayed from the electrolytic water supply pipe 71, a filter member 72 which is freely detachably mounted in the electrolytic water supply tray 75, a support portion(s) 76 for supporting the electrolytic water supply tray 75 and a water level sensor 77 for detecting the water level of the electrolytic water supply tray 75.

As shown in FIGS. 7 and 8, plural electrolytic water supply holes 75b are formed in the bottom portion of the electrolytic water supply tray 75, and the electrolytic water sprayed from the electrolytic water supply pipe 71 is dropped from the electrolytic water supply holes 75b to the gas-liquid contact member 3.

Figure 9:
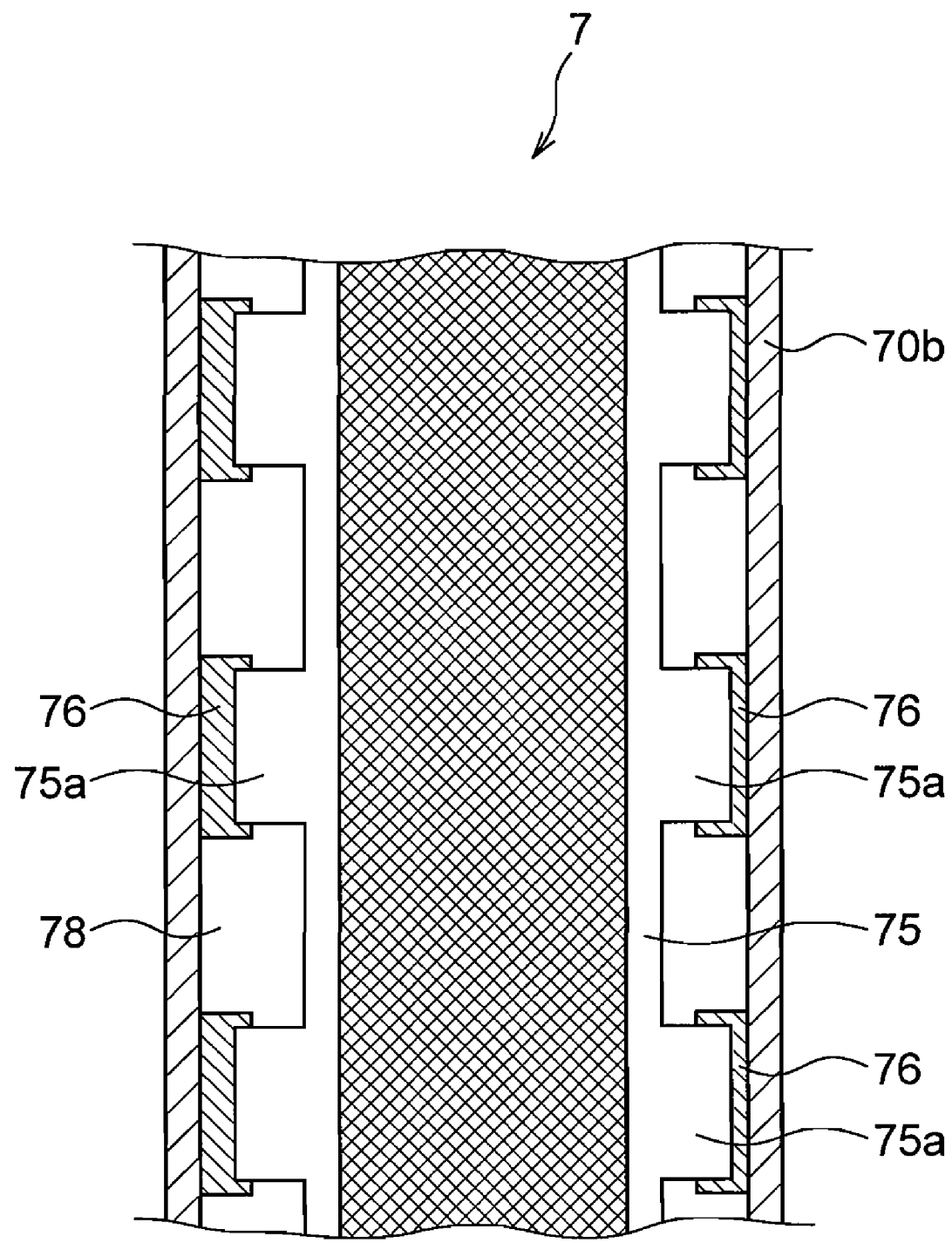
FIG. 9 is a Y-Y' cross-sectional view of FIG. 8 of the electrolytic water supply unit of FIG. 7.

As shown in FIGS. 8 and 9, plural small piece portions 75a projecting outwardly from the electrolytic water supply tray 75 are provided to the upper edge of the electrolytic water supply tray 75 so as to be spaced from one another at predetermined intervals, and the small piece portions 75a are mounted on the support portion 76, whereby the electrolytic water supply tray 75 is supported on the support portion 76.

The filter member 72 is fully laid on the whole surface of the bottom portion of the electrolytic water supply tray 75, and the electrolytic water sprayed to the electrolytic water supply tray 75 is filtered by the filter member 72 to remove foreign materials such as scales, humic acid, etc. The electrolytic water from which the foreign materials are removed is dropped from the electrolytic water supply holes 75b of the electrolytic water supply tray 75 to the gas-liquid contact member 3.

When the filter member is clogged with foreign materials, the water level in the electrolytic water supply tray 75 increases. The exchange timing of the filter member 72 can be known on the basis of the water level detected by the water level sensor 77. For example, the operating panel 11 or the like may be equipped with an alarm lamp or the like which is turned on to indicate that the exchange timing of the filter member 72 has come when it is detected by the water level sensor 77 that the water level in the electrolytic water supply tray 75 reaches a predetermined water level, whereby a user or the like is informed of the exchange timing.

Furthermore, as shown in FIG. 9, the support portions 76 and the small piece portions 75a are arranged so as to be spaced from one another at predetermined intervals, and the gap between the neighboring the support portions 76 (small piece portions 75a) serves as an overflow port 78. That is, the electrolytic water overflowing from the electrolytic water supply tray 75 flows out from the overflow ports 78 to the lower portion.

Slope pieces 79 which are downwardly sloped in cross-section are provided to the inner walls of the filter unit 70b so as to be disposed at the lower side of the electrolytic water supply tray 75. The electrolytic water flowing out from the over-flow ports 78 flows downwardly from the side walls of the electrolytic water supply tray 75 along the slope pieces 79, and drops from the gap between the slope pieces 79 to the gas-liquid contact member 3. The over-flow ports 78 and the slope pieces 79 provided to the inner walls of the filter unit 70b constitute a bypass passage of the electrolytic water.

The water spray box 7 thus constructed is assembled to the upper edge portion of the gas-liquid contact member 3 in the filter unit 70b. The upper edge of the gas-liquid contact member 3 is provided with a sheet 31 for uniformly distributing the electrolytic water dropped from the water spray box 7 to the gas-liquid contact member 3.

Next, the operation of this embodiment will be described.

By operating the operation panel 11 shown in FIG. 1, the operation of the on-floor mount type air filtering apparatus 1 is started. When the operation of the air filtering apparatus 1 is started, a circulating pump 5 shown in FIG. 6A is driven, and tap water or the like stocked in a water supply tank support tray 8b is supplied to the electrolytic bath 4.

In the electrolytic bath 4, a predetermined voltage is applied between the electrodes 41 and 42, and DC current flows between the electrodes 41, 42 to electrolyze the tape water or the like, whereby electrolytic water containing active oxygen species such as hypochlorous acid, ozone, hydrogen peroxide or the like is generated. This electrolytic water is introduced into the electrolytic water supply pipe 71, passed through the water spray holes 74 (not shown) of the electrolytic water supply pipe 71, sprayed to the electrolytic water supply tray 75 and then dropped to the gas-liquid contact member 3 from the electrolytic water supply hole 75b to the gas-liquid contact member 3 while foreign materials (scales, etc.) are removed from the electrolytic water by the filter member 72 mounted in the electrolytic water supply tray 75. The electrolytic water passes through the distributing sheet 31, and gradually infiltrates from the upper edge portion of the gas-liquid contact member 3 through the main body of the gas-liquid contact member 3 to the lower portion thereof.

The air blowing fan 22 is driven by the driving motor 23, and indoor air sucked from the air suction port 15 by the air blowing fan 2 is passed from the air flowing port 22a of the air blowing fan 22 through a passage indicated by an arrow of FIG. 3 to the gas-liquid contact member 3. The gas-liquid contact member 3 into which electrolytic water infiltrates is supplied with the indoor air by the air blowing fan 22. This indoor air comes into contact with the active oxygen species contained in the electrolytic water infiltrating in the gas-liquid contact member 3, and then blown out from the air blow-out port 12 into the room again. The gas-liquid contact member 3 has high affinity to the electrolytic water. In this case, the water retentivity (wettability) of the gas-liquid contact member 3 to the electrolytic water is kept, and the contact between the indoor air and the active oxygen species can be continued for a long time.

For example when influenza virus invades into indoor air, the active oxygen species function to break down and vanish (remove) the surface protein (spike) of the virus concerned which is indispensable for infection. When the surface protein of influenza virus is broken down, the influenza virus is not joined to a receptor which is necessary for infection of the virus concerned, so that infection can be prevented. As a result of a verification test which was made in cooperation with Sanitary Environment Research, it has been found that when air in which influenza virus invades is passed through the gas-liquid contact member 3 of this embodiment, 99% or more of the virus concerned can be removed.

On the other hand, extra electrolytic water is discharged from the gas-liquid contact member 3, passed through the water receiving tray 8a shown in FIG. 6A to the neighboring water supply tank support tray 8b and then stocked therein. The construction of the air filtering apparatus of this embodiment adopts a water circulating system, and a circulation path for electrolytic water is formed. Accordingly, when the amount of water is reduced due to vaporization or the like, a suitable amount of tap water or the like is supplied through the water supply tank 6 into the water supply tank support tray 8b. When the amount of water in the water supply tank 6 is reduced, the opening/closing lid 13 (see FIG. 1) is opened to take out the water supply tank 6, and tap water or the like is supplemented into the water supply tank 6.

Furthermore, according to this embodiment, when electrolytic water is supplied to the gas-liquid contact member 3, foreign materials such as scales such as calcium carbonate, magnesium carbonate, etc., insoluble materials such as humic acid, etc. can be withdrawn at one place by the foreign material removing mechanism such as the filter member 72 or the like. In addition, foreign materials can be withdrawn every time the foreign materials such as scales, etc. flow out from the electrolytic bath 4 together with the electrolytic water, and thus the frequency of the maintenance can be reduced. For example, a work of withdrawing scales removed from the electrodes 41, 42 is not required to be carried out every time the pole switching operation of the electrodes is periodically carried out, and thus the frequency of the maintenance can be reduced. Furthermore, electrolytic water is supplied to the gas-liquid contact member 3 after foreign materials are removed from the electrolytic water, and thus foreign materials such as scales, humic acid, etc. can be prevented from adhering to the gas-liquid contact member 3, and thus the frequency of the maintenance of the gas-liquid contact member 3 can be reduced.

Furthermore, the filter member 72 is freely detachably mounted in the electrolytic water supply tray 75, and thus when the filter member 72 is clogged with foreign materials, the filter member 72 can be easily exchanged and the labor of the maintenance can be reduce as compared with the case where the gas-liquid contact member 3 itself is exchanged.

In this embodiment described above, the water spray box 7 is designed in a box-shape, and it has the electrolytic water supply pipe unit 70a designed like a box lid, and the filter unit 70b designed like a box main body. Therefore, when the filter member 72 is exchanged, the electrolytic water supply pipe unit 70a can be easily detached from the filter unit 70b and the maintenance can be easily performed.

Furthermore, when the filter member 72 is clogged in the electrolytic water supply tray 75, the water level of the electrolytic water in the electrolytic water supply tray 75 increases. Therefore, on the basis of the water level detected by the water level sensor 77, a user, a maintenance manager or the like can grasp the exchange timing of the filter member 72. At this time, if the exchange timing of the filter member is informed to the user by turning on a lamp on the operation panel 11 or the like when the water level in the electrolytic water supply tray 75 reaches to a predetermined water level, for example, the water level at which the filter member 72 should be exchanged, the user, the maintenance manager or the like can easily grasp the exchange timing of the filter member 72.

In this embodiment, when electrolytic water over-flows from the electrolytic water supply tray 75 due to clogging of the filter member 72 or the like, the over-flowing electrolytic water can be supplied to the gas-liquid contact member 3 through the bypass path. Therefore, even when the filter member 72 is not exchanged although the exchange timing of the filter member 72 has elapsed, it is possible to supply the electrolytic water to the gas-liquid contact member 3 and continue the operation of the air filtering apparatus.

Furthermore, in this embodiment, electrolytic water containing hypochlorous acid is collected in the water receiving tray 8a, and flows to the adjacent water supply tank support tray 8b. Therefore, fungus, etc. do not occur in the trays 8a, 8b, and occurrence of slime can be prevented. Therefore, the frequency of cleaning and maintenance of the trays 8a, 8b can be reduced, and the labor of the maintenance, etc. can be also reduced.

According to the first embodiment described above, the foreign materials such as scales, insoluble materials, etc. occurring in the electrolytic bath 4, etc. are removed by the filtering mechanism of the filter member 72 interposed between the electrolytic water supply pipe 71 and the gas-liquid contact member 3, whereby the foreign materials such as scales, etc. can be removed from the circulating system of the electrolytic water. The foreign material removing mechanism is not limited to the filtering mechanism based on the filter member 72, and any mechanism may be adopted in place of the filtering mechanism insofar as it can remove foreign materials such as scales, etc. Furthermore, if such a mechanism is used in combination with the filtering mechanism, the foreign material removing effect can be more enhanced.

Next, a second embodiment of the foreign material removing mechanism according to the present invention will be described. According to the second embodiment, a foreign material trap mechanism is provided to the water receiving tray to remove foreign materials from the circulating system of the electrolytic water. The construction of the foreign material trap mechanism will be described in detail with reference to FIGS. 10A, 10B and 11.

Foreign materials (insoluble materials) such as scales, etc. which are removed from the electrodes by reversing the polarities of the electrodes 41, 42 (i.e., pole changing operation) are passed through the gas-liquid contact member 3 together with the electrolytic water and then discharged to the water receiving tray 8a. For example, even when the filter member 72 is disposed at the upstream side of the gas-liquid contact member 3, the electrolytic water overflowing from the electrolytic water supply tray 75 contains foreign materials. In this case, these foreign materials may pass through the gas-liquid contact member 3 to the water receiving tray 8a.

Figure 10A:
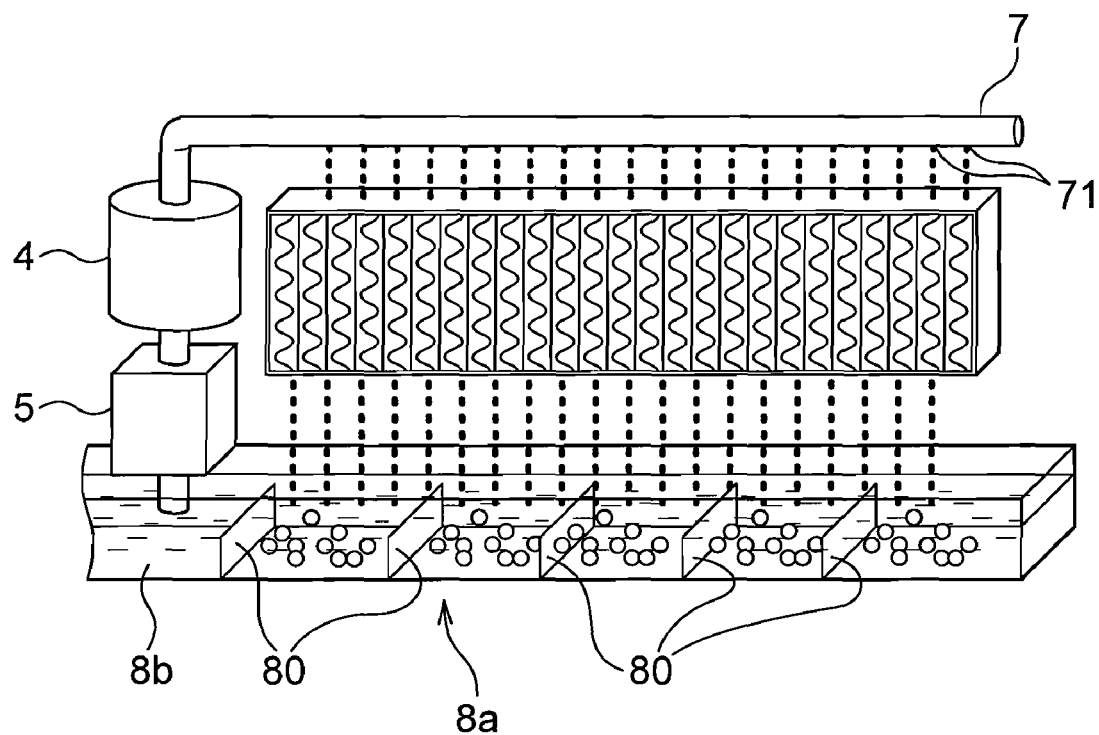
Figure 10B:
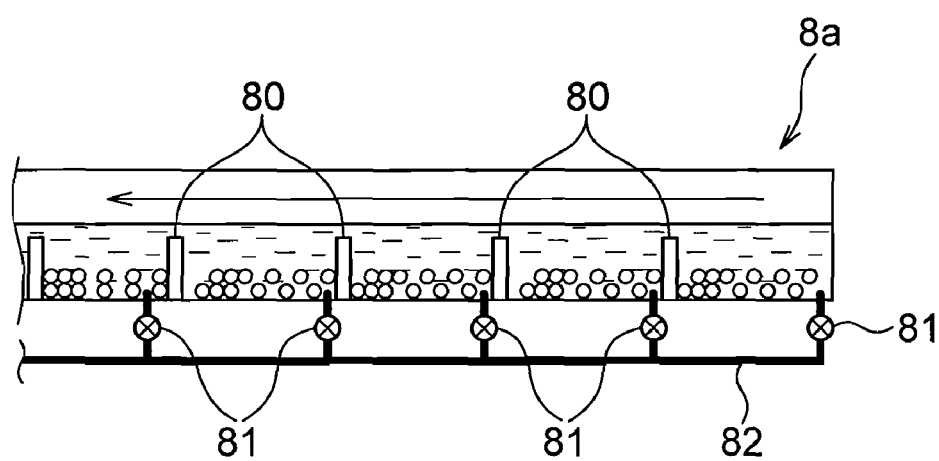

According to this embodiment, as shown in FIGS. 10A, 10B, the water receiving tray 8a is provided with a dam member for damming (trapping) foreign materials such as scales, etc. contained in electrolytic water from the gas-liquid contact member 3 and preventing the foreign materials from flowing out from the water receiving tray 8a to the water supply tank support tray 8b when the electrolytic water in the water receiving tray 8a is supplied through the water supply tank support tray 8b to the electrolytic bath 4 by the circulating pump 5. The dam member comprises one or plural dams 80 arranged from the upstream side to the downstream side with respect to the flow of the electrolytic water which occurs in the water receiving tray 8a due to the electrolytic water supply operation to the electrolytic bath 4 by the circulating pump 5. By providing the dams 80 as described above, only the electrolytic water flowing over the damps 80 flows into the water supply tank support tray 8b as shown in FIG. 10B.

Furthermore, as conceptually shown in FIG. 10B, the water receiving tray 8a is provided with one or plural discharge valves 81 for discharging the foreign materials such as scales, etc. trapped by the dams 80 from the water receiving tray 8a to the outside together with the electrolytic water. Each discharging valve 81 is provided at the upstream side of each dam 80, and each discharging valve 81 is connected to a drain tube 82. The drain tube 82 is connected to a drain tray 9, and the electrolytic water and the foreign materials in the water receiving tray 8a are discharged through the drain tube 82 to the drain tray 9.

Next, the operation of this embodiment will be described.

By operating the operation panel 11 shown in FIG. 1, the operation of the on-floor mount type air filtering apparatus 1 is started. When the operation of the air filtering apparatus 1 is started, the circulating pump 5 of FIG. 10A is driven, and tap water or the like stocked in the water supply tank support tray 8b is pumped up and supplied to the electrolytic bath 4.

In the electrolytic bath 4, a predetermined voltage is applied between the electrodes 41, 42, and DC current flows between the electrodes 41 and 42 to electrolyze tap water or the like, whereby electrolytic water containing hypochlorous acid, ozone and hydrogen peroxide is generated.

This electrolytic water is introduced into the electrolytic water supply pipe 71, passed through the water spray holes 74 (not shown) of the electrolytic water supply pipe 71, and then dropped to the gas-liquid contact member 3. The electrolytic water gradually infiltrates from the upper edge portion of the gas-liquid contact member 3 through the main body thereof to the lower portion while coming into contact with the indoor air sucked from the air suction port 15 by the air blowing fan 22. At this time, the indoor air is brought into contact with the active oxygen species contained in the electrolytic water infiltrating in the gas-liquid contact member 3, and blown out from the air blow-out port 12 into the room again. Extra electrolytic water is discharged from the gas-liquid contact member 3, and received in the water receiving tray 8a. The above operation is the same as the first embodiment.

In this embodiment, as shown in FIGS. 10A, 10B, foreign materials such as scales, etc. contained in the electrolytic water precipitate in the water receiving tray 8a, and only the electrolytic water flowing over the dams 80 flows to the adjacent water supply tank support tray 8b and is stocked there.

The construction of the air filtering apparatus of this embodiment adopts a water circulating system. Therefore, the electrolytic water stocked in the water supply tank support tray 8b is supplied to the electrolytic bath 4 again by the circulating pump 5. When the amount of water is reduced due to vaporization or the like in the water supply tank support tray 8b, a suitable amount of tap water or the like is supplied through the water supply tank 6 into the water supply tank support tray 8b. When the amount of water in the water supply tank 6 is reduced, the opening/closing lid 13 (see FIG. 1) is opened to take out the water supply tank 6, and tap water or the like is supplemented into the water supply tank 6.

When the operation is finished or the maintenance is carried out, the discharge valves 81 provided in the water receiving tray 8a and a drain valve (not shown) provided in the water supply tank support tray 8b are opened, whereby the electrolytic water stocked in the water receiving tray 8a and the water supply tank support tray 8b can be drained to the drain tray 9. Furthermore, the foreign materials such as scales, etc. trapped by the dams 80 are discharged from the discharge valves 81 to the drain tray 9 together with the electrolytic water.

Furthermore, in this embodiment, the dams 80 are provided to the water receiving tray 8a for receiving electrolytic water discharged from the gas-liquid contact member 3. Therefore, the foreign materials contained in the electrolytic water discharged from the gas-liquid contact member 3 are withdrawn at the water receiving tray 8a, so that these foreign materials can be prevented from returning to the electrolytic bath 4. Therefore, the electrolysis performance of the electrolytic bath 4 and the durability of the electrodes 41, 42 can be kept, and the frequency of the maintenance for withdrawing foreign materials such as scales, etc. can be reduced.

Furthermore, according to this embodiment, the plural dams 80 are provided in the water receiving tray 8a so as to be arranged along the direction from the upstream side to the downstream side with respect to the flow direction of the electrolytic water from the water receiving tray 8a to the water supply tank support tray 8b. Therefore, even when the amount of foreign materials contained in electrolytic water is large, the foreign materials can be damped at each dam 80. Accordingly, the foreign materials such as scales, etc. can be more surely prevented from flowing out from the water receiving tray 8a to the water supply tank support tray 8b, so that the foreign materials can be more surely prevented from being pumped up by the circulating pump 5 and returned to the electrolytic bath 4. Therefore, the frequency of the maintenance can be reduced.

Still furthermore, according to this embodiment, the discharge valves 81 for discharging the foreign materials such as scales, etc. dammed by the dams 80 from the water receiving tray 8a together with the electrolytic water are provided in the water receiving tray 8a. Therefore, the foreign materials such as scales, etc. dammed by the dams 80 can be discharged from the water receiving tray 8a together with the electrolytic water. The electrolytic water and the foreign materials such as scales, etc. are discharged through the drain tube 82 to the drain tray 9. The drain tray 9 is configured to be freely drawn out from the drain tray support portion 91. Therefore, the maintenance work of drawing out the drain tray 9 from the drain tray support portion 91, discharging the electrolytic water in the drain tray 9 and remove the foreign materials such as scales, etc. can be easily performed.

In the above embodiment, calcium-based scales and magnesium-based scales generated in the electrolytic bath 4 are mainly described as foreign materials. However, the foreign materials trapped in the water receiving tray 8a by the dams 80 may contain scales which are generated when water in the gas-liquid contact member 3 and the water receiving tray 8a is vaporized and thus the electrolytic water is condensed (for example, calcium-based scales, silica-based scales).

Furthermore, a deposition promoting member for depositing scale components contained in electrolytic water discharged from the gas-liquid contact member 3 may be provided in the water receiving tray 8a. In this case, the scale components contained in the electrolytic water are deposited by the deposition promoting member, and the scales can be dammed by the dams 80 and withdrawn, so that the scales can be efficiently removed. A porous ceramic member may be used as the deposition promoting member. With the above construction, the concentration of calcium ions or magnesium ions contained in the electrolytic water can be reduced, and the generation of the scales in the electrolytic bath 4 can be suppressed, so that the maintenance frequency can be more greatly reduced.

Furthermore, the water receiving tray (water receiving portion) 8a and the water supply tank support tray (electrolytic water stock portion) 8b may be configured as separate tray-like members so as to be continuously connected to each other, or they may be configured as a unified tray-like member as shown in FIGS. 10A, 10B. The heights of the dams 80 provided to the water receiving tray 8a (water receiving portion) may be set so that all the dams 80 have the same height or the dam 80 at the water supply tank support tray 8b side is higher than the height of the other dams 80. The height of the dams 80 is suitably adjustable in accordance with the amount of foreign materials (scales, etc.) contained in the electrolytic water discharged from the gas-liquid contact member 3 and the specific construction of the water receiving portion and the stock portion.

Figure 11:
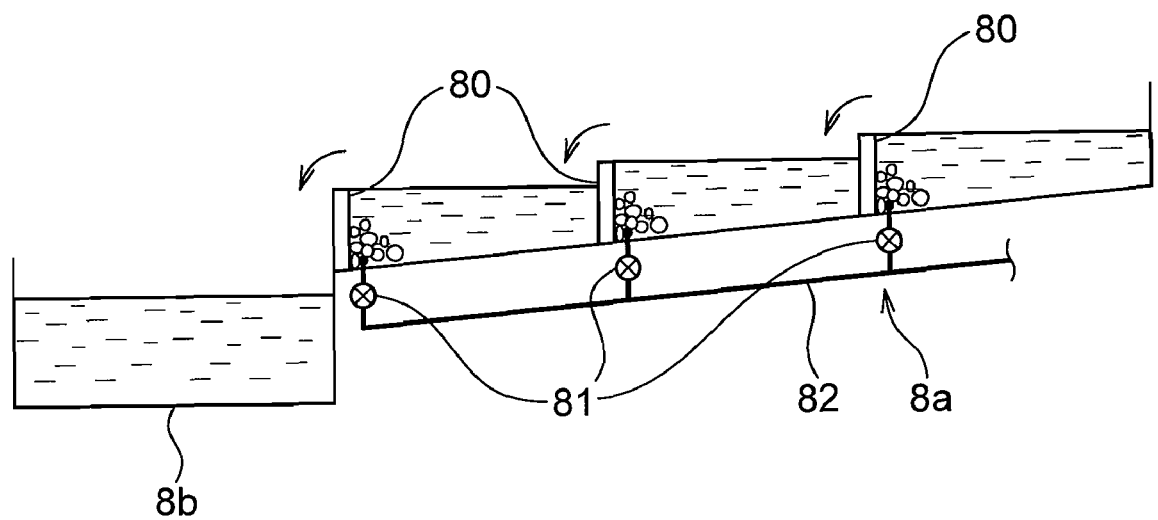
FIG. 11 is a diagram showing a modification of the water receiving tray having the foreign material removing mechanism of the second embodiment.

As conceptually shown in FIG. 11, the dams 80 provided in the water receiving tray 8a may be formed of filter members, and the bottom surface of the water receiving tray 8a may be configured to be arbitrarily inclined so that the upstream side of the bottom surface is higher than the downstream side of the bottom surface at the water supply tank support tray 8b. According to the above construction, large scales having large particle sizes are precipitated and deposited in front of each dam 80, and scales having small particle sizes and colloidal scales floated in the water are captured by the filter members, so that only electrolytic water from which foreign materials are filtered can be made to flow to the water supply tank support tray 8b. Furthermore, in the above construction, even when the filters constituting the dams 80 are clogged, the precipitated scales are dammed by the dams 80, and only the electrolytic water flowing over the dams 80 can be made to flow to the water supply tank support tray 8b. Therefore, even when the exchanging timing of the filter members constituting the dams 80 is delayed, the operation of the air filtering apparatus 1 can be continued without disturbing the circulation of the electrolytic water. Furthermore, in the case of the construction shown in FIG. 11, a drain hole may be provided in front of each dam 80, and a discharge valve 81 for opening/closing the drain hole may be provided to the drain hole. In this case, by opening the drain valve 81, foreign materials such as scales, etc. which are precipitated and deposited in front of the dams 80 can be discharged to the drain tray 9 together with electrolytic water in the water receiving tray 8a. The discharge valve 81 may be configured to open/close the drain hole itself or the flow path of the drain tube 82 connected to the drain hole. The same is applicable to the construction of FIG. 10B.

In the embodiment described above, electrolytic water containing hypochlorous acid or the like is collected in the water receiving tray 8a, and flows to the water supply tank support tray 8b. Therefore, no microorganism such as virus, bacteria, fungus, etc. occurs in each tray 8a, 8b, and occurrence of slime can be prevented. Therefore, the frequency of the cleaning and maintenance of each tray 8a, 8b can be reduced, and the labor of the maintenance, etc. can be reduced.

Various modifications may be made to the air filtering apparatus 1 of the above embodiments without departing from the subject matter of the present invention.

For example, in the above embodiments, a water supply system based on the water supply tank 6 which can be freely taken in and out is adopted. However, in place of the water supply tank 6, a water pipe supply system in which a tap water pipe is connected to the air filtering apparatus to directly introduce tap water (city water) may be adopted.

Furthermore, in the above embodiments, the electrolytic water supply unit of dropping electrolytic water to the gas-liquid contact member 3 so that the electrolytic water infiltrates into the gas-liquid contact member 3 is adopted. However, the present invention is not limited to this mode, and electrolytic water may be made to infiltrate into the gas-liquid contact member 3 by a suction system. In this case, for example, two dams are provided in the water receiving tray 8a, and there are formed a foreign material removing area in which electrolytic water is introduced and the filter member 72 is freely detachably mounted to remove foreign materials such as scales, etc. contained in electrolytic water, and an electrolytic water holding area which is adjacent to the foreign material removing area and stocks electrolytic water from which foreign materials are removed in the foreign material removing area. The lower edge portion of the gas-liquid contact member 3 is submerged in the electrolytic water in the electrolytic water holding area, and the electrolytic water is sucked by a so-called capillary phenomenon.

Furthermore, the above embodiment mainly relates to the construction of generating hypochlorous acid as active oxygen species. However, the construction of generating ozone ($O_3$), hydrogen peroxide ($H_2O_2$) or the like as active oxygen species may be adopted.

In this case, when platinum tantalum electrodes are used as the electrodes, active oxygen species can be highly efficiently and stably generated from water in which ion species are rare (for example, well water).

At this time, at the anode, the following reaction occurs:

$$2H_2O \rightarrow 4H^+ + O_2 + 4e^-$$

Simultaneously with the above reaction, the following reactions occur, and ozone ($O_3$) is generated.

$$3H_2O \rightarrow O_3 + 6H^+ + 6e^-$$

$$2H_2O \rightarrow O_3 + 4H^+ + 4e^-$$

Furthermore, at the cathode, the following reactions occur:

$$4H^+ + 4e^- + (4OH^-) \rightarrow 2H_2 + (4OH^-)$$

$$O_2^- + e^- + 2H^+ \rightarrow H_2O_2$$

That is, $O_2^-$ generated through the electrode reaction and $H^+$ in solution are bonded to each other to generate hydrogen peroxide ($H_2O_2$).

In this construction, ozone ($O_3$) and hydrogen peroxide ($H_2O_2$) which have strong sterilizing power are generated by supplying current to the electrodes 41, 42 in the electrolytic bath 4, and electrolytic water containing ozone ($O_3$) and hydrogen peroxide ($H_2O_2$) can be created and supplied to the gas-liquid contact member 3.

In the above embodiments, indoor air sucked from the air suction port 15 provided to the front surface of the housing 10 is brought into contact with electrolytic water dropped to the gas-liquid contact member 3, and then blown out from the air blow-out port 12 provided to the upper portion of the housing 10. Therefore, even when the on-floor mount type air filtering apparatus 1 is set up in a so-called large space such as a kindergarten, an elementary/junior high/high school, long-term care insurance facilities, a hospital or the like, indoor air which comes into contact with the electrolytic water and thus filtered (i.e., sterilized, inactivated or the like) can be blown out far away in the large space, so that the filtering (sterile filtration, etc.) of air can be efficiently performed in the large space. At the same time, deodorization can be performed.

Furthermore, in the above-described embodiments, the foreign material removing mechanism is disposed in the electrolytic water supply/circulating passage, particularly at the upstream side of the gas-liquid contact member (i.e., in the electrolytic water supply unit) or at the downstream side of the gas-liquid contact member (i.e., in the water receiving portion). However, the present invention is not limited to these embodiments. They may be set up at any place in the electrolytic water supply/circulating passage insofar as foreign materials such as scales, etc. can be removed. Furthermore, the setup position is not limited to one place, and plural same type or different type foreign material removing mechanism may be set up at different places. Alternatively, these foreign material removing mechanisms may be set up at least one place in combination.

What is claimed is:

1. An air filtering apparatus for filtering air with electrolytic water comprising:

a housing having an air suction port and air blow-out port;

an electrolytic bath for generating electrolytic water;

a gas-liquid contact member disposed in the housing;

an electrolytic water supply unit for supplying the electrolytic water to the gas-liquid contact member so that the electrolytic water infiltrates into the gas-liquid contact member;

an air blowing fan for bringing indoor air sucked from the air suction port into contact with the electrolytic water infiltrating in the gas-liquid contact member and blowing out the indoor air from the air blow-out port;

a water receiving portion for receiving the electrolytic water passed through the gas-liquid contact member; and a foreign material removing mechanism that removes foreign materials contained in the electrolytic water and disposed in an electrolytic water supply/circulation passage through which the electrolytic water flows from the electrolytic bath through the electrolytic water supply unit to the gas-liquid contact member and further passes from the gas-liquid contact member through the water receiving portion, wherein the foreign material removing mechanism has a filter member that is freely detachably mounted in the electrolytic water supply unit and filters the electrolytic water introduced from the electrolytic bath to remove the foreign materials, wherein the electrolytic water supply unit has an electrolytic water supply tray having an electrolytic supply hole formed in the bottom portion thereof, the electrolytic water passing through the filter member being supplied to the gas-liquid contact member through the electrolytic water supply hole; and further comprising a water level sensor for detecting a water level of the electrolytic water in the electrolytic water supply tray, and an alarm unit for alarming a user so that the filter member should be exchanged when it is detected by the water level sensor that the water level in the electrolytic water supply tray reaches a predetermined water level.

2. The air filtering apparatus according to claim 1, wherein the electrolytic water supply unit has a bypass path for supplying electrolytic water flowing over the electrolytic water supply tray to the gas-liquid contact member.

3. The air filtering apparatus according to claim 1, wherein the electrolytic water is electrolytic water containing active oxygen species achieved by supplying current to at least a pair of electrodes in the electrolytic bath to electrolyze water or water containing chlorine ions.

4. The air filtering apparatus according to claim 3, wherein the active oxygen species contain at least one material selected from the group consisting of hypochlorous acid, ozone and hydrogen peroxide.

5. The air filtering apparatus according to claim 3, wherein the foreign materials contained in the electrolytic water contain scales removed from the electrodes by poly changing of the electrodes, scales deposited from the electrolytic water or colloidal silica suspended substance.

6. The air filtering apparatus according to claim 1, wherein the foreign material removing mechanism has a dam member provided in the water receiving portion to trap the foreign materials contained in the electrolytic water in the water receiving portion.

7. The air filtering apparatus according to claim 6, further comprising a circulating pump for pumping the electrolytic water received in the water receiving portion to supply the electrolytic water to the electrolytic bath, wherein the dam member traps the foreign materials contained in the electrolytic water in the water receiving portion when the electrolytic water is supplied to the electrolytic bath by the circulating pump.

8. The air filtering apparatus according to claim 7, wherein the circulating pump supplies electrolytic water flowing over the dam member to the electrolytic bath.

9. The air filtering apparatus according to claim 7, further comprising an electrolytic water stock portion to which electrolytic water flowing over the dam member flows from the water receiving portion, wherein the electrolytic water stock portion is continuously connected to the water receiving portion and the circulating pump supplies the electrolytic water flowing in the electrolytic water stock portion to the electrolytic bath.

10. The air filtering apparatus according to claim 6, wherein the dam member comprises a plurality of dams provided in the water receiving portion.

11. The air filtering apparatus according to claim 10, wherein the plural dams are arranged at a slant so that a dam at the upstream side with respect to the flow direction of the electrolytic water is higher than a dam at the downstream side.

12. The air filtering apparatus according to claim 6, wherein the dam member comprises a filter member.

13. The air filtering apparatus according to claim 6, further comprising a deposition promoting member for promoting deposition of scale components contained in the electrolytic water.

14. The air filtering apparatus according to claim 6, where in the water receiving portion is provided with a discharge valve for discharging the foreign materials trapped in the water receiving portion by the dam member from the water receiving portion together with the electrolytic water.

15. The air filtering apparatus according to claim 6, wherein the electrolytic water is electrolytic water containing active oxygen species achieved by supplying current to electrodes in the electrolytic bath to electrolyze water or water containing chlorine ions.

16. The air filtering apparatus according to claim 15, wherein the active oxygen species contain at least one material selected from the group consisting of hypochlorous acid, ozone and hydrogen peroxide.

* * * * *